United States Patent Office 3,418,262
Patented Dec. 24, 1968

3,418,262
PREPARATION OF MACROPOROUS
ION EXCHANGE RESINS
Louis E. Wérotte and Paul D. Grammont, Chauny, France, assignors to Diamond Shamrock Corporation, Cleveland, Ohio, a corporation of Delaware
No Drawing. Filed Apr. 19, 1967, Ser. No. 631,886
Claims priority, application France, Apr. 28, 1966, 59,462
11 Claims. (Cl. 260—2.2)

ABSTRACT OF THE DISCLOSURE

Macroporous resins are prepared by copolymerizing an aqueous suspension of at least one mono-olefinic monomer, such as styrene, with at least one polyolefinic monomer, such as divinylbenzene, in the presence of at least one saturated aliphatic carboxylic acid which is relatively water-insoluble, e.g., caprylic acid. Ion exchange material of high porosity and having excellent resistance to attrition may then be formed from these resins by chemical treatment to either introduce or activate ion exchange groups.

Background of the invention.—The present invention relates to the preparation of resins having a rigid-sponge structure, so-called macroporous resins and, in particular, to the preparation of such resins which are in turn capable of being converted into ion exchange materials.

The advantages of resins of such type are well known. For example, the pores present in the structure of these resins facilitate the access both of the chemical agents used to convert same into ion exchange materials and, on completion of such conversion, of the liquids to be subjected to the ion exchange process.

One of the general techniques used to prepare such resins in the form of macroporous beads comprises effecting the suspension copolymerization in water of at least one monoolefinic monomer with at least one polyolefinic monomer, in the presence of a so-called precipitant, or non-solvent, porogenic agent. Said porogenic agent should be miscible with the monomers, but is a relatively poor swelling solvent for the resulting copolymer.

The porogenic agent, when substantially removed from the copolymer, leaves channels in the latter that result in the desired macroporous structure.

Heretofore, the materials recommended as being useful porogenic agents in this technique were alcohols, ethers and hydrocarbons which are solvents for the monomers, but are poor swelling agents for the polymers formed therefrom.

Summary of the invention.—It has now been discovered that saturated aliphatic carboxylic acids, insoluble or poorly soluble in water, advantageously may be used for this purpose, i.e., to serve as porogenic agents. Such acids are miscible with the monomers without necessarily dissolving same. On the contrary, it is generally found that they are dissolved in the monomers and it is believed that they do not participate actively in the polymerization reaction, but are present merely as inactive diluents.

In order to obtain the desired macroporous character, the carboxylic acids of this invention should be used at a level of from 5-50% on the basis of total weight of the monomers plus the acid used as the porogenic agent.

Thus, the invention has for its objects a process for the preparation of macroporous resins by the suspension copolymerization in water of at least one mono-olefinic monomer with at least one poly-olefinic monomer, said process being characterized in that said copolymerization is effected in the presence of a saturated aliphatic carboxylic acid, insoluble or poorly soluble in water, said acid comprising about 5–50% of the total weight of the monomers plus the acid.

Description of the preferred embodiments.—The preferred porogenic agents are saturated aliphatic carboxylic acids, having a water-solubility of less than about 2%, although acids having a solubility slightly above that level may be used if a salt such as sodium chloride is added to the copolymerization medium to reduce the degree of dissolution to acceptable limits. In view of this requirement for relatively low solubility, aliphatic acids having at least 5 carbon atoms are preferred.

Illustrative of porogenic agents useful in the practice of the invention are acids such as caprylic, 2-ethyl-1-hexanoic, lauric, palmitic, stearic, 2-methyl-1-butanoic, 3,3-dimethylbutanoic, 3-methyl-1-butanoic, 1-pentanoic, cyclo-butanoic, 2-ethyl-1-butanoic, 2-methylpentanoic, 3-methyl-1-pentanoic, 4-methylpentanoic, 2-methyl-2-ethylbutanoic, hexanoic, 5-methyl-1-hexanoic, 2-ethyl-1-pentanoic, 2-methylhexanoic, 4-methyl-1-hexanoic, 2,2-dimethyl-1-hexanoic, 4-methyl-4-ethylbutyric, heptanoic and pelargonic acids.

In order to reduce the melting point of the porogenic agent, vary the pore size of the resin obtained, or for other reasons, it may be desirable to use as a porogenic agent a mixture of saturated aliphatic carboxylic acids and such a practice is within the scope of this invention.

The macroporosity resulting from the practice of this invention is a function of the amount of carboxylic acid used and also of the molecular weight of said acid. For a given porosity, there should be used a higher percentage of low molecular weight acid than of high molecular weight acid.

The use of saturated aliphatic carboxylic acids as porogenic agents has numerous advantages, as compared with the former porogenic agents such as alcohols, ethers and hydrocarbons, as will be seen in fuller detail hereinafter. Such acids are, for example, relatively non-volatile and non-toxic materials. Furthermore they may be removed from the resin merely by treating with a base which treatment renders the acids soluble in the water of dispersion. This removal of said acids may be effected at fairly low temperatures, thereby retaining the structure of the resin unaltered. Also, the reclamation of the thus-solubilized organic acids is readily effected by acidification of the solution. For such acidification, the diluted residual acids obtained as by-products on subsequent sulfonation of the resin to convert same into cation exchange materials, may be used. Finally, the salt solutions obtained from such neutralization may then be used to convert the sulfonated resins into the alkali metal form.

The production of the resin spherules or beads takes place in the usual manner by the copolymerization of an aqueous suspension of monomers, the difference being, of course, that the carboxylic acid is added. The monomer-acid mixture is dispersed in the water using conventional dispersing agents. Copolymerization is effected at the usual temperatures with the conventional initiators, such as organic peroxides azo-bis aliphatic nitriles or inorganic persalts.

The mono-olefinic monomers useful in the practice of the present invention may be any one of those commonly used for the preparation of ion-exchange materials, such as mono-vinyl aromatic hydrocarbons, e.g., styrene, vinyltoluene, vinyl-naphthalene and analogous compounds, acrylonitrile or acrylic and methacrylic esters. Heterocyclic vinyl compounds such as vinylpyridine are also useful.

The poly-olefinic monomer, which serves as a crosslinking agent to render the resin insoluble, may also be any one of the monomers conventionally used for this purpose and is preferably a polyvinyl aromatic hydrocarbon such as divinylbenzene (DVB) or trivinylbenzene, a glycol dimethacrylate such as ethylene glycol dimethacrylate, or a polyhydric alcohol polyvinyl ether such as divinyloxyethane. A relatively minor amount of this polyolefinic monomer is used with respect to the mono-olefinic monomer, the proportion by weight thereof being generally less than 30% of the total monomer weight.

The resin beads resulting from the copolymerization are more or less opaque according to their porosity and have a resistance to attrition higher than that of the macroporous beads obtained by former processes.

The principal application of such resin beads is the production of ion exchange materials. To prepare such materials, the beads are submitted to a treatment either capable of introducing ion-exchange groups into the resin or of activating potential ion exchange groups already present therein.

Such treatments are well known to those skilled in the art. For instance, the prepare cation exchange materials, the resin may be submitted to sulfonation. For the same purpose, when the original resin is formed from acrylonitrile or an acrylic ester, it may be submitted to hydrolysis which will convert the nitrile or ester groups into carboxylic acid groups.

To prepare anion exchange materials, the macroporous resins resulting from the copolymerization may be submitted, for example, to haloalkylation followed by amination. As a further example, when one of the monomers used to produce the resins contains tertiary amine groups, the resin may be converted into a strong-base anion exchange material, following copolymerization, by alkylation of the amine groups into quaternary ammonium groups.

The examples below are set forth by way of illustration of the present invention and should not be considered limiting.

Examples 1/8 illustrate the preparation of the macroporous resins themselves using the porogenic agents of the present invention.

Example 1

A solution of 0.3 gm. of the ammonium salt of a styrene-maleic anhydride copolymer (SMAC) and 4 gm. of gum arabic is heated in 200 cc. of water. When the temperature of 96° C. is reached, a mixture of 111 gm. of styrene, 34.5 gm. of DVB (63% pure), 78 gm. 2-ethyl-1-hexanoic acid and 1.1 gm. benzoyl peroxide is added rapidly, with stirring. The temperature, which drops to about 75° C. is brought back to 88° C. and is maintained at that level. After 4 hours at 88° C., an aqueous solution of caustic soda (300 gm./liter of NaOH) is added until the pH persists at 12; the temperature is maintained for a further three hours at 90–94° C. The beads are then filtered and washed with water until neutral. The dispersion water and the first liter of wash water are set aside for recovery of the acid contained therein (88–95%) recovery. The beads are dried in an oven at 75° C. for twelve hours. The average yield is 96% by weight of the monomers used. The beads, slightly translucent when moist, become entirely opaque white after drying.

Example 2

The procedure of Example 1 is used, except that only 48 gm. of the ethyl-hexanoic acid and 0.96 gm. of benzoyl peroxide are used. The beads obtained after drying are transparent.

Example 3

A solution of 0.3 gm. of the ammonium salt of SMAC and 4 gm. of gum arabic in 160 cc. of water is heated to a temperature of 96° C. at which time a mixture of 111 gm. of styrene, 34.5 gm. of DVB (63% pure), 48 gm. of lauric acid and 0.96 gm. of benzoyl peroxide is added with stirring. The temperature is maintained for four hours at a level of 88° C. Caustic soda (300 gm./liter) is then added until a pH of 12 persists and heating is continued at 90–94° C. for an additional three hours. The reaction mixture is filtered and washed with water until neutral. The beads obtained are opaque and are present in an amount corresponding to a yield (on a total monomer basis) of 96%.

Example 4

A solution of 0.338 gm. of the ammonium salt of SMAC and 3.6 gm. of gum arabic in 200 cc. of water is heated to 88° C. A mixture of 119.7 gm. of styrene, 10.3 gm. of DVB (63% pure), 115 gm. caprylic acid and 2.21 gm. of benzoyl peroxide is then added with stirring. The temperature is maintained at 88° C. for four hours at which time an aqueous solution of caustic soda is added until the pH remains at 12. The temperature is now raised to 92° C. and is maintained at that level for two hours. The beads are then filtered and washed, first with 1 liter of boiling water and then with cold water until neutral. The filtrate and wash water are set aside for recovery of the caprylic acid. The beads are dried at 75° C. for twelve hours and it is found that a yield of 97% is obtained.

Example 5

A solution of 4 gm. of gum arabic, 0.37 of the ammonium salt of SMAC and 60 gm. of sodium chloride in 160 cc. of water is heated to 64° C. A mixture of 101 gm. of acrylonitrile, 24.4 g. of 61.5% DVB, 31.5 gm. caprylic acid and 3.2 gm. of benzoyl peroxide is then added with stirring. The temperature is first maintained at 60–62° C. for four hours, then is brought up to 78° C. over a one hour period and is maintained for additional hour at this level. The wet resin beads, which are yellowish and opaque, are filtered, washed with hot water and dried at 75° C. for twelve hours.

Example 6

A solution of 4 gm. of gum arabic, 0.37 gm. of ammonium salt of the styrene-maleic anhydride copolymer and 60 gm. of NaCl in 160 cc. of water is heated to 64° C. A mixture of 94.5 gm. of acrylonitrile, 30.5 gm. of 61.5% pure DVB, 31.5 gm. of caprylic acid and 2.6 gm. of peroxide catalyst (Trigonox X 27) is now added with stirring. The temperature is first maintained at 60–62° C. for two hours and then brought up to 78° C. over a one hour period and is maintained at that level for an additional hour. The beads, which are yellowish and opaque, are filtered, washed with hot water and dried at 75° C. for twelve hours.

Example 7

As mentioned previously, the activity of carboxylic acids as porogenic agents is not a function of their ability to dissolve the monomers. This may be demonstrated by the following experiment:

At temperatures below 25° C., styrene is not entirely soluble in stearic acid (M.P.=69.6° C.). Indeed, when stearic acid is melted in a test tube and is then allowed to solidify, and an amount of styrene equal to 10% by weight of the acid is poured over this block of acid, supernatant styrene remains even after forty eight hours. In contrast, when 10% stearic acid is added on the basis of a given weight of styrene under the same conditions, a solution is obtained. Therefore, one is justified in speaking of a stearic acid solution in styrene.

The phenomenon is the same in the case of lauric acid (M.P.=44° C.).

Thus, the acids cannot be said to be solvents for the monomers. Nevertheless, these acids, which are non-solvents for the monomers, may be used as porogenic agents. This is demonstrated below by effecting a suspension polymerization at a temperature below the melting point of the porogenic agent.

Example 8

To a solution containing 4 gm. of gum arabic, 0.35 gm. of the ammonium salt of SMAC and 160 cc. of water and heated to 62-63° C., there is added a mixture of 111 gm. of styrene, 34.6 gm. of 62.5% pure DVB, 40.5 gm. of stearic acid (M.P.=69-70° C.) and 2.24 gm. of benzoyl peroxide. After heating eighteen hours at 62-63° C., the beads are filtered on a Buchner filter and washed with methanol to dissolve the stearic acid. The beads obtained are macroporous.

The following Examples 9-14 illustrate the preparation of cation exchange materials using the macroporous resins prepared according to the instant teaching.

Example 9

Fifty grams of the resin beads prepared in Example 1 are added to 320 gm. of sulfuric acid monohydrate and the temperature is gradually raised over a period of six hours to 100° C. This temperature is then maintained for one hour. After cooling, dilution, filtration and washing, the resultant beads have a cation exchange capacity of 2.1 equivalents per liter in the sodium form (eq./l./Na) and of 4.5 eq./kg./Na.

Example 10

Fifty grams of resin beads prepared as in Example 2 are treated as in Example 9 to effect their sulfonation. When following the course of the sulfonation microscopically, it is apparent that sulfonation reaches a very advanced stage at 80° C. Operating similarly, but with beads prepared without the porogenic agent, it is found that sulfonation does not start much before 100° C.

It is apparent from this fact that, while some do not exhibit the opaque appearance characteristic of macroporous beads, resin beads prepared according to the teaching of the present invention are more readily sulfonatable than beads prepared without the porogenic agent.

Example 11

Fifty grams of beads prepared as in Example 3 are added to 275 gm. of sulfuric acid monohydrate. Then 53.5 gm. of chlorosulfuric acid is added over a period of 20-30 minutes at room temperature, after which the temperature is brought to 65° C. over a three hour period and is maintained at 65° C. for one hour. The material is then cooled and washed. The resultant beads have a cation exchange capacity of 2.05 eq./l./Na and of 4.45 eq./kg./Na.

Example 12

Fifty grams of dried beads, prepared as in Example 4, are added to 350 cc. of 98% $H_2SO_4$. The temperature is brought to 110° C. after which the resultant material is cooled to less than 30° C. and hydrated. The hydrated beads have a cation exchange capacity of 1.1 eq./l./Na and of 4.6 eq./kg./Na.

Example 13

Sixty grams of dried resin beads, produced as described in Example 5, are added to 200 cc. of 60% $H_2SO_4$. The mixture is then heated at boiling and hydrolyzed by refluxing for 15 hours. After cooling, the material is diluted with water and washed until neutral. The resultant resin beads have a cation exchange capacity of 3.73 eq./l. in H form, 2.43 eq./l. in Na form and 8.93 eq./kg. in Na form.

Example 14

Sixty grams of dried beads, prepared as in Example 6, are added to 200 cc. of 60% $H_2SO_4$. The mixture is then heated under reflux for fifteen hours. The resultant beads have an exchange capacity of 3.6 eq./l. in H form, of 2.46 eq./l. in Na form and of 7.7 eq./kg. in Na form.

Example 15 shows the production of an anion exchange material using a macroporous resin produced according to the instant invention.

Example 15

According to the technique of Examples 1-6, resin beads are prepared using styrene and divinylbenzene as the monomers and lauric acid as the porogenic agent. The divinyl-benzene is used in the amount of 15% by weight of the monomers, and 25% of the lauric acid is used on the basis of the total weight of monomers plus acid. Chloromethylation of 30 gm. of the dried beads is then effected using 64 gm. chloromethyl ether in the presence of 25 gm. of $AlCl_3$ in 100 ml. of petroleum ether. These chloromethylated beads are then aminated with trimethylamine, yielding an anion exchange material having an exchange capacity of 1.21 eq./l. in Cl form and of 3.8 eq./kg. in Cl form.

To compare the properties of the macroporous ion exchange materials produced according to this invention with macroporous exchange materials produced according to the prior art wherein alcohols are used as porogenic agents, attrition resistance and porosity tests were carried out.

The resistance of the beads to attrition or mechanical wear is measured using an apparatus which comprises a cylinder 16 mm. in diameter and 300 mm. high, which contains a piston actuated by an automatic pneumatic device. Into the cylinder are introduced 20 cc. of resin beads screened to a size of 0.5-0.6 mm. and a quantity of water. These beads are subjected, over a period of fifty minutes, to one hundred piston strokes under a pressure of 3 kg./cm.$^2$. The beads are then rescreened using the 0.5 mm. screen with the beads remaining on the screen and beads passing through the screen being collected separately in dried and tared filter crucibles. These fractions are then weighed after drying, with the amount of material passing through the screen indicating the percentage of broken beads. This percentage represents a measure of the resistance of the material to attrition. A figure of less than 1% is considered to represent an excellent resistance to attrition.

For the purpose of comparison, the attrition figures obtained with sulfonated styrene-divinylbenzene beads prepared using either carboxylic acids or alcohols as porogenic agents are set forth in Table I below. In this table, the percentage of divinylbenzene percent (DVB) is calculated on the basis of the total monomer weight, and the percentage of porogenic agent on the basis of the total weight of monomers plus porogenic agent.

TABLE I

| Sample No. | Percent, DVB present | Porogenic agent | Percent, porogenic agent | Percent, attrition |
|---|---|---|---|---|
| 1 | 5 | Caprylic acid | 47 | 0.5 |
| 2 | 8 | do | 36 | 0.2 |
| 3 | 10 | do | 35 | 0.31 |
| 4 | 12 | do | 31 | 0.35 |
| 5 | 12 | Ter-amyl alcohol | 35 | 3.2 |
| 6 | 12 | Sec-butyl alcohol | 30 | 1.75 |
| 7 | 15 | Lauric acid | 25 | 0.3 |

Table II illustrates the comparative porosity of ion-exchange materials prepared according to the practice of the present invention as compared to the porosity of ion-exchange materials prepared using prior art techniques. For the purposes of this illustration, styrene-divinylbenzene resins were prepared containing 12% divinylbenzene and using as porogenic agents various acids and alcohols the identity and quantity of which are indicated in Table II. After formation of these copolymer spherules, they were passed through a screen and the fractions within the size range of from 0.5-0.6 mm. were then sulfonated to produce ion-exchange resins. The porosity of these resins was determined through the use of a moisture regain test as described hereinbelow.

The test was conducted by first drying a given quantity of the resin at 75° C. to a constant weight followed by exposure of the resin to an atmospher having a relative humidity of 80% at a temperature of 75° C. for a period of 39 hours. The total weight gain by each of the resins is then indicative of the amount of water taken up by said resins and consequently is an index of their porosity. The quantity of water taken up by each resin is indicated in Table II as well as the quantity of water taken up per equivalent of resin. Finally, since the porosity is proportional to the quantity of porogenic agent used, Table II shows the relative porosity of each resin on a 30% porogenic agent basis indicated by the amount of water taken up per equivalent on this basis.

TABLE II

| Sample No. | Porogenic agent | Percent, porogenic agent | Capacity (eq./kg./Na) | $H_2O$ regain (gm.) | $H_2O$ regain per equiv. (gm.) | $H_2O$ regain equiv. (gm.) 30— porogenic agent basis |
|---|---|---|---|---|---|---|
| 1 | Caprylic acid | 31 | 4.56 | 312 | 68.4 | 66.1 |
| 2 | Stearic acid | 23.5 | 4.52 | 222 | 49.1 | 62.6 |
| 3 | Amyl alcohol | 35 | 4.46 | 262 | 58.7 | 50.4 |
| 4 | Butyl alcohol | 30 | 4.58 | 242 | 52.9 | 52.9 |

Thus it can be seen from Table II above that, using equal proportions of porogenic agents, the carboxylic acids of the present invention are more efficient in terms of the porosity obtained than the alcohols taught by the prior art.

While the invention has been described in terms of specific embodiments thereof, these specific descriptions are not to be considered as limitative since changes and alterations therein may be made which are within the full and intended scope of the invention as described by the appended claims.

What is claimed is:

1. An improvement in the process for the production of a macroporous resin by the suspension copolymerization in an aqueous medium of at least one mono-olefinic monomer selected from the group consisting of mono-vinyl aromatic hydrocarbons, acrylonitrile, acrylic esters, methacrylic esters and heterocyclic vinyl compounds, with at least one polyolefinic monomer selected from the group consisting of polyvinyl aromatic hydrocarbons, glycol of dimethacrylates and polyhydric alcohol polyvinyl ethers, which improvement comprises conducting the copolymerization in the presence of at least one saturated aliphatic carboxylic acid having at least 5 carbon atoms.

2. A process as in claim 1 wherein the saturated aliphatic carboxylic acid has a solubility in water of less than about 2%.

3. A process as in claim 1 wherein the saturated aliphatic carboxylic acid is present within the range of from about 5 to 50% by weight on a monomer plus acid basis.

4. A process as in claim 1 wherein the saturated aliphatic carboxylic acid is selected from the group consisting of caprylic, 2-ethyl-1-hexanoic, lauric, palmitic and stearic acids.

5. A process as in claim 1 wherein the mono-olefinic monomer is styrene.

6. A process as in claim 1 wherein the polyolefinic monomer is divinylbenzene.

7. A process as in claim 1 wherein the poly-olefinic monomer is present in an amount of less than about 30% of the total monomer weight.

8. An improvement in the process for the production of ion-exchange materials from macroporous resins obtained by the copolymerization of an aqueous suspension of at least one mono-olefinic monomer selected from the group consisting of mono-vinyl aromatic hydrocarbons, acrylonitrile, acrylic esters, methacrylic esters and heterocyclic vinyl compounds with at least one poly-olefinic monomer selected from the group consisting of polyvinyl aromatic hydrocarbons, glycol of dimethacrylates and polyhydric alcohol polyvinyl ethers, said resins being converted to ion-exchange materials by chemical treatment thereof, which improvement comprises conducting the copolymerization in the presence at least one saturated aliphatic carboxylic acid having at least 5 carbon atoms.

9. A process as in claim 8 wherein the ion-exchange material is a strong-acid action exchange material and is produced by sulfonation of the macroporous resin.

10. A process as in claim 8 wherein the ion-exchange material is a weak-acid cation exchange material and is produced by hydrolysis of the macroporous resin.

11. A process as in claim 8 wherein the ion-exchange material is an anion exchange material and is produced by the successive haloalkylation and amination of the macroporous resin.

References Cited

UNITED STATES PATENTS 3,322,695  5/1967  Alfrey et al. _____ 260—2.5

FOREIGN PATENTS 849,122  9/1960  Great Britain.
885,719  12/1961  Great Britain.
932,125  7/1963  Great Britain.

WILLIAM H. SHORT, *Primary Examiner.*

M. GOLDSTEIN, *Assistant Examiner.*

U.S. Cl. X.R.

260–2.1, 2.5, 85.5, 23.5, 86.1, 86.7, 88.1, 88.2